May 19, 1970     E. G. LOHMAN     3,512,794
PULL-BACK CHUCK FALSE JAWS FOR MACHINE CHUCKS
Filed Feb. 23, 1968     2 Sheets-Sheet 1
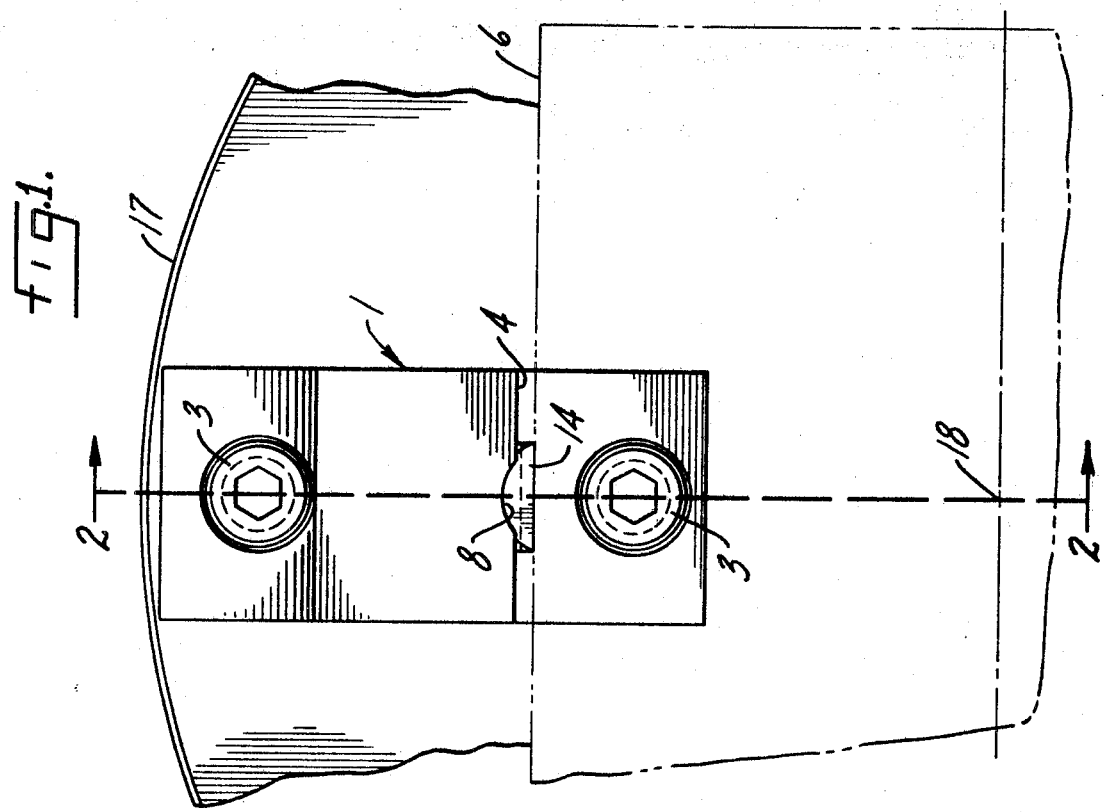
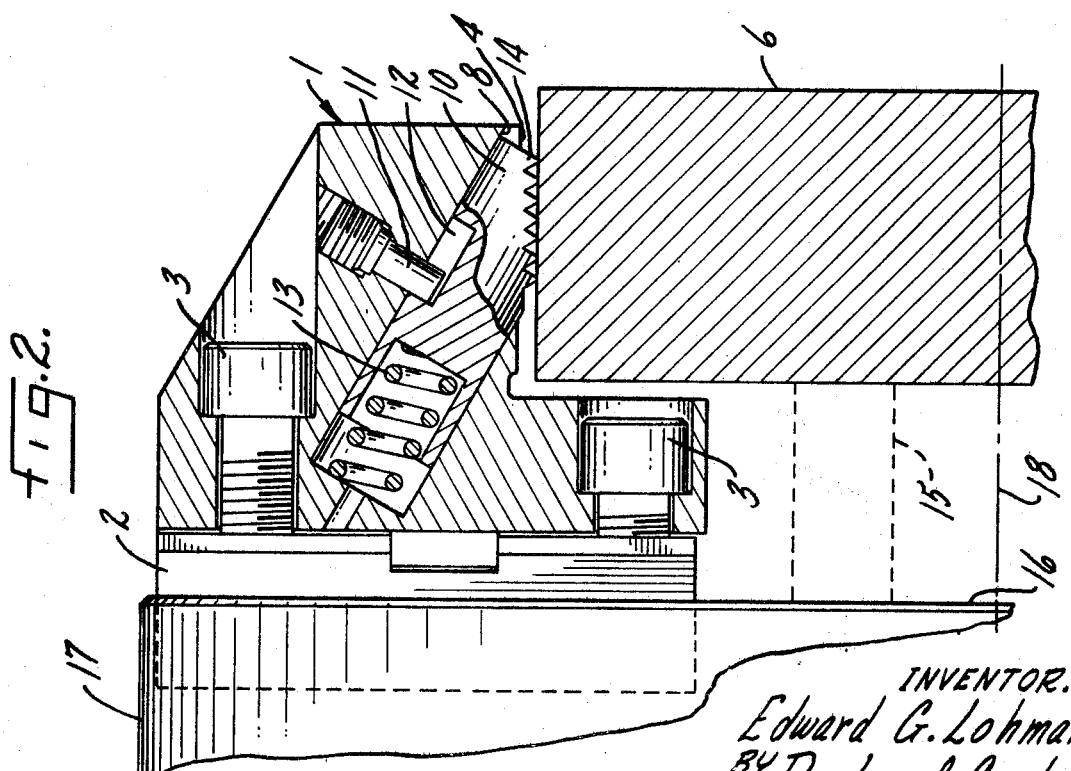
INVENTOR.
Edward G. Lohman,
BY Parker & Carter
Attorneys.

May 19, 1970 E. G. LOHMAN 3,512,794
PULL-BACK CHUCK FALSE JAWS FOR MACHINE CHUCKS
Filed Feb. 23, 1968 2 Sheets-Sheet 2

INVENTOR.
Edward G. Lohman,
BY Parker & Carter
Attorneys.

United States Patent Office 3,512,794
Patented May 19, 1970

3,512,794
PULL-BACK CHUCK FALSE JAWS FOR
MACHINE CHUCKS
Edward G. Lohman, Logansport, Ind., assignor to Logansport Machine Co., Inc., Logansport, Ind., a corporation of Indiana
Filed Feb. 23, 1968, Ser. No. 707,586
Int. Cl. B23b 31/16
U.S. Cl. 279—123                                    4 Claims

ABSTRACT OF THE DISCLOSURE

Pull-back camming elements are associated with the false jaws of a chuck or other work holding device so that when serrated camming plungers in the false jaw contact the work, further radial movement of the false jaws causes the camming plungers to move inwardly forcibly drawing the work back against and seating it upon the locator bars or other positive stops on the chuck or work holding device. Further inward movement of the false jaw continues the camming action until the gripping surface of the false jaw machined to mate with the contour of the workpiece has seated on and gripped the work. The spring pressed camming plunger still grips the work but the work is positively held by contact with the false jaw. This makes it unnecessary to take time to hammer the workpiece into positive engagement with the stops on the chuck or holding device face.

SUMMARY

This invention relates to improvements in machine tool chuck or other work holding device where so-called false jaws are placed upon the chuck or holding device master jaws and where the gripping surface of the false jaw is machined to mate with the contour of the workpiece. The gripping surface of the false jaw machined to mate with the contour of the workpiece may be inside or outside of the workpiece. If the jaws are outside the workpiece, the gripping pressure will be inwardly. If the jaws are inside the workpiece, the gripping pressure will be outwardly. In each case the radial movement of the jaws, inward or outward with the mating contact of the jaw and work will be a positive force to hold the work in position. The false jaw is machined to a shape that fits the work and that is why a false jaw is used so that changes to fit different kinds of work may be easily made.

The chuck will always have locator bars or locator means and as the jaws are forced inwardly toward the work it has been in the past customary to hammer the work back along the jaws into contact with fixed locator elements or bars on the chuck or holding device face. This is a time spending operation and always leaves opportunity for inadequate seating, which would result in inaccurate machining.

Cam plungers having serrations in angled faces thereof in a plane at right angles to the longitudinal axis of the plunger are lapped into bored holes in the false jaws. Each plunger is forced outwardly by a spring, is held against rotation by a slot engaged by a guide screw, which guide screw also limits the outward excursion of the plunger.

BRIEF DESCRIPTION OF THE DRAWINGS

Referring to the drawings:
FIG. 1 is a detail partial front elevation of a machine tool chuck showing the jaw arranged for contact with the outside of the work;
FIG. 2 is a section along the line 2—2 of FIG. 1 showing parts in elevation.

DESCRIPTION OF THE PREFERRED EMBODIMENTS

Figure 3:
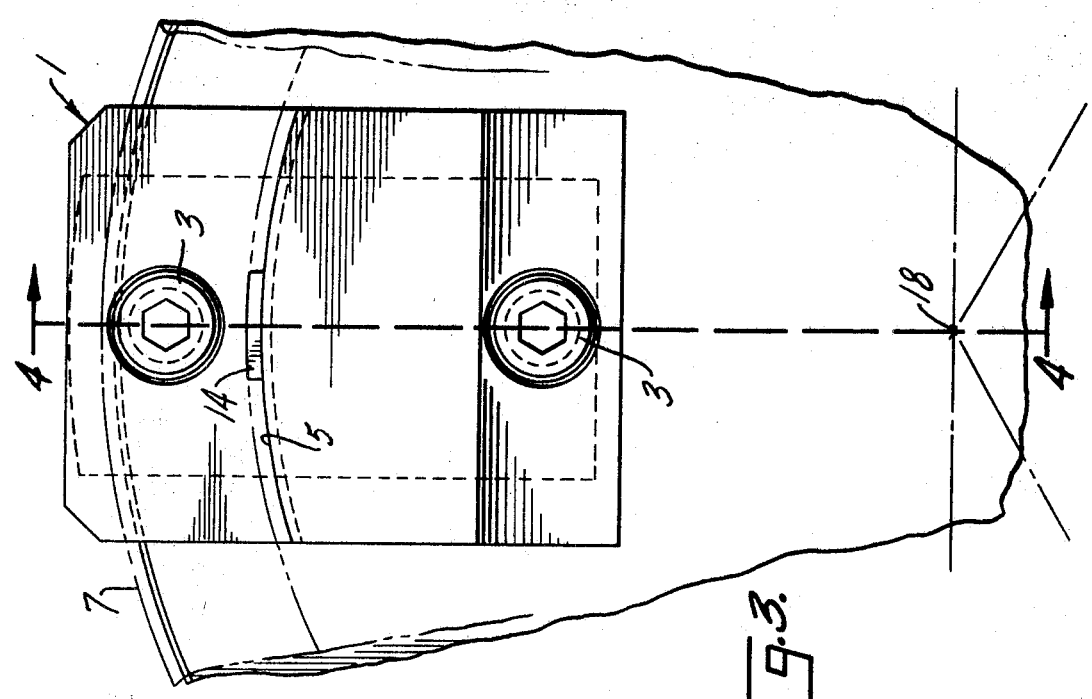
FIG. 3 is a detail partial front elevation of a chuck with jaw arranged for contact with the outside of the work.
Figure 4:
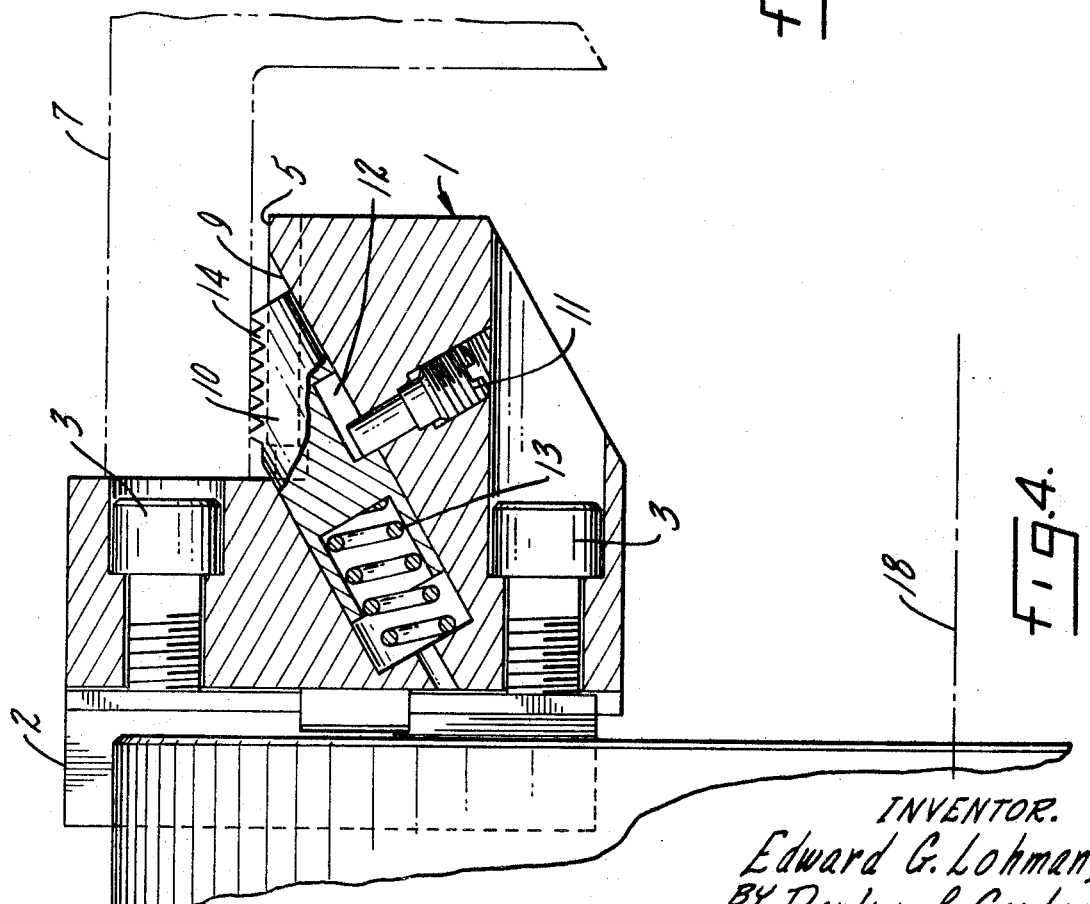
FIG. 4 is a section along the line 4—4 of FIG. 3.
Like parts are indicated by like numerals throughout the specification and drawings.

The chuck itself in the interest of simplicity is shown only in part and only diagrammatically.

The false jaw 1 is rigidly and removably mounted upon the radially movable master jaw 2 being held in place thereon by cap screws 3. The inner face 4 or the outer face 5 of the false jaw is machined in accordance with the usual practice to mate with the outer or inner contour of the workpiece 6 or 7 as the case may be. The false jaw has a bored hole 8 inwardly inclined or a bored hole 9 outwardly inclined to the gripping surfaces of the false jaw. Camming or pull-back plungers 10 are lapped in one or other of the holes 8 or 9, are held against rotation with respect to the false jaw by a pin 11, threaded in the false jaw and penetrating the longitudinal slot 12 in the cam plunger. A spring 13 urges the cam plunger outwardly, the excursion being limited by the pin 11. The plungers where they project beyond the inner or outer face of the gripping surfaces are serrated as at 14 in a plane such that when the plunger is withdrawn the outer elements of the serrations are in the same plane or the same curved surface as the gripping surface of the false jaw. Locator bars or other positive stop elements 15 are carried by the face of the chuck 16.

It is of course essential that when the work is held in the chuck for machining, it must be a positive hold and it must be in exactly the same position with respect to the chuck as every other piece being worked on.

To avoid the necessity and the difficulty and hard work of driving the work back against the locator bar or other element, the cam plungers 10 projecting as they do above the gripping surface are first contacted by the work as the work is placed in the chuck. The operator will usually push the work into the chuck as far as he can in the hope of getting it up snugly against the locator element and as the false jaws move inwardly or outwardly in the usual manner, the serrated plunger ends engage the work. Further radial movement of the false jaws causes the plunger 10 to slide inwardly with respect to the false jaw and cam the serrated surfaces 14 longitudinally inward to force the work against the locator bars. Since the movement of all the false jaws is controlled by the jaw closing mechanism and since the contour of the gripping surfaces fits the work, the inward camming movement of each of the plungers will be uniform. The result is that all parts of the work are positively urged inwardly in parallelism until the work is snugly against the locator bars or elements at every point. Further inward movement of the false jaws with continued camming effect of the cam plungers merely results in inward movement or slippage of the cam serrations in axial direction toward final seating of the false jaws. At the time the false jaws are finally seated on the mating contour of the workpiece, the spring still holding the serrations snugly against the workpiece, but the spring effect is not relied upon to hold the work. This is done by the mating, work gripping surfaces.

I have illustrated only one of the master jaws. There usually will be three such jaws, each carrying a false jaw and each moving inwardly or outwardly radially to hold the work. The means for urging the master jaws inwardly or outwardly radially are conventional and need no special illustration. Suffice it to say that the type of false jaw here illustrated may be applied with equal effect on any of the many types of master jaws found in the machine tool industry. I have illustrated diagrammatically the master jaw where it protrudes from the chuck housing 17 which contains as is usual all the other elements of the chuck.

It will be understood in accordance with usual machine tool practice that the chuck rotates about the usual center line indicated at 18. The chuck is mounted on the usual hollow chuck shaft with the draw bar longitudinally movable therein with means in the chuck between the draw bar and the master chuck members to move them radially toward or from the work and lock the jaws in position depending on whether or not the work is gripped from the inside or from the outside. The particular mounting of the jaws and their support on the chuck body are conventional and in the interest of simplicity have not been illustrated or described.

I claim:

1. In a machine tool chuck, a work locator, a jaw radially movable toward and from the work, a plunger socketed in the jaw, biased for outward movement along a path inclined to the axis of rotation of the chuck, means for preventing rotation of the plunger and for limiting the outward excursion of the plunger to permit a work-contacting surface on the plunger to project beyond a work-contacting surface on the jaw, the angle of inclination of the plunger being such that, as the jaw moves toward the work, engagement of the plunger with the work cams the plunger inwardly against the bias to force the work toward the locator until the work-contacting surface on the jaw engages the work.

2. The device of claim 1 characterized by the fact that a socket containing the plunger extends inwardly from the work-contacting surface of the jaw, the axis of the socket being along a line inclined to the face of the jaw.

3. The device of claim 2 characterized by the fact that the bias means includes a spring contained within the jaw abutting the inboard end of the plunger.

4. The device of claim 2 characterized by the fact that the plunger is slotted and an adjustable screw is socketed in the jaw with a tip penetrating the slot to limit both the inward and the outward movement of the plunger.

References Cited

UNITED STATES PATENTS

| | | | |
|---|---|---|---|
| 1,799,019 | 3/1931 | Mischler | 279—123 |
| 2,158,490 | 5/1939 | Webster | 269—138 |

FOREIGN PATENTS 160,095  1905  Germany.

ROBERT C. RIORDON, Primary Examiner

D. D. EVENSON, Assistant Examiner

U.S. Cl. X.R.

269—136, 138